United States Patent Office 3,451,203
Patented June 24, 1969

3,451,203
MACHINE FOR MAKING ELECTRICAL CABLE
Yvan Eyraud, Lyon, France, assignor to Compagnie Generale d'Electricite, Paris, France
Filed May 10, 1967, Ser. No. 637,535
Claims priority, application France, May 10, 1966, 61,001
Int. Cl. H02b 13/08, 7/18
U.S. Cl. 57—6      10 Claims

ABSTRACT OF THE DISCLOSURE

A machine for the production of "meander" type electric cables, comprising means for applying a plurality of wires along the core of a cable moving longitudinally through a tubular guide having a finger at the exit thereof for distorting the wires into a meander disposition, and means for subsequently winding on the cable two tapes, the first of which holds the wires on the core on both sides of the finger, and the other one of which lays on the cable the undulation remaining on the wires when the finger has become disengaged therefrom.

---

This invention relates to electric cables of the type known as "meander-type" cables which consist of an assembly of main central conductors about which there is wound various insulating and conducting layers including a layer of auxiliary wires whose winding direction is periodically reversed, for example, at the end of each winding pitch or fraction thereof, so as to have a meander-like disposition along the length of the cable. The layer of auxiliary wires, which serves as a protection or as a neutral conductor, due to its advantageous disposition on the cable has sufficient slack to make it unnecessary to cut it at those points at which it is desired to connect the wires to ground potential or the provide access to the main conductors.

The present invention relates more particularly to a machine or device for the production of a "meander-type" cable. Such machines for the production of this particular type of cable have been proposed heretofore and are based primarily upon the use of a reciprocating guide disc or head through which the auxiliary wires extend and due to which a reciprocating or meander-like winding of the auxiliary wires is achieved along the length of the cable. However, the present invention provides for a machine for the production of cable of the type described wherein the meander-like disposition of the auxiliary wires is achieved through a continuous rotation of a guide member in a single direction thereby eliminating the need for a reciprocating head or disc as provided in the prior art.

The machine in accordance with the present invention is distinguished notably by the fact that it comprises the following elements: A tube rotating about its axis, through the interior of which the assembly of main conductors passes, this tube being terminated at one end by a finger or guide member in the form of a pigtail for controlling the disposition of the auxiliary wires; a number of supply coils regularly distributed around the cable, each of which supplies one of the auxiliary wires; guide means for the said wires, disposed along the cable in such a manner as to guide the wires along a path parallel to the axis of the cable and controlling the passage of the wires over the guide member extending from the end of the rotating tube; and two supply coils, disposed on a taping head, the axis of which is parallel to that of the tube through which the main conductors pass and which rotates in the same direction at the same speed as the latter tube, the said supply coils supplying two tapes secured by guide surfaces so as to be so located that the first tape holds the auxiliary wires fast on the cable on either side of the guide member and the second tape is wound upon the cable to hold the undulation which remains formed on the auxiliary wires after disengagement of the guide member owing to the advance movement of the cable.

It is an object of the present invention to provide a machine for the manufacture of meander-like cables which provide for improved operating efficiency and increased economy of manufacture as compared to known machines of a similar nature.

It is another object of the present invention to provide a machine of the type described capable of providing increased accuracy of production and dependability of operation due to simplified construction thereof.

These and other objects, features and advantages of the present invention will become more apparent from the following detailed description thereof when taken in conjunction with the accompanying drawings, which disclose one embodiment of the present invention, and wherein.

Figure 1:
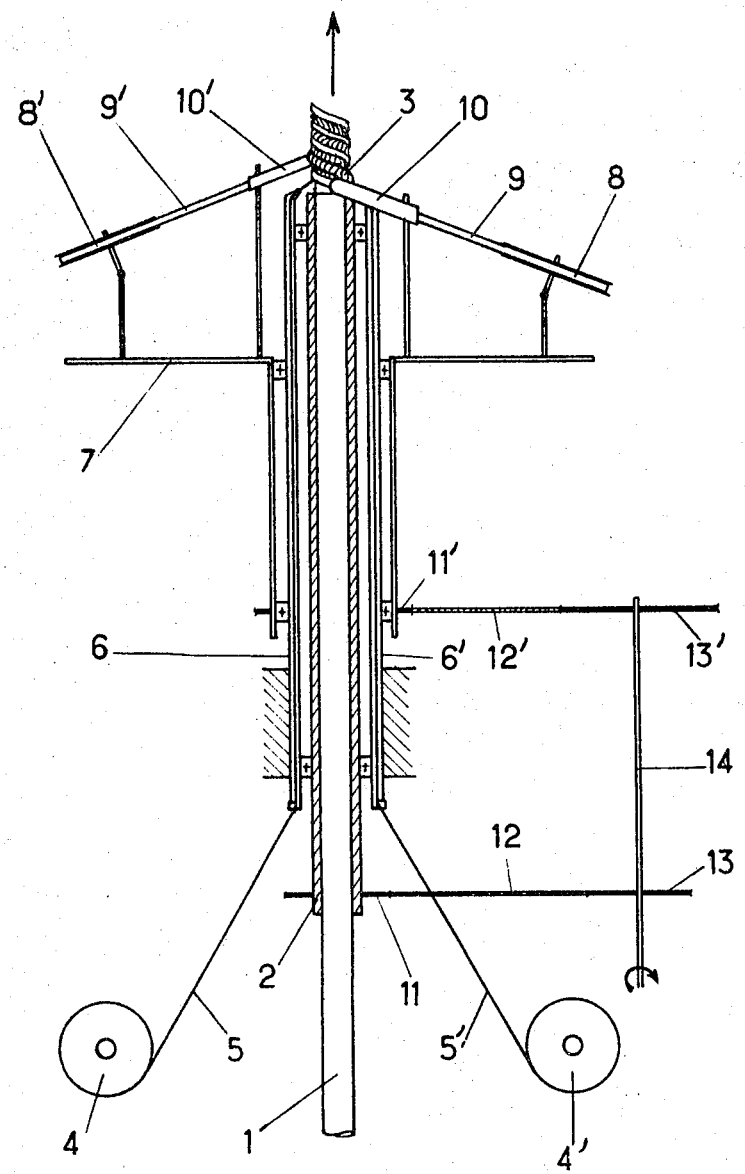
FIGURE 1 is a diagramatic view partly in section of the machine in accordance with the present invention.

Looking now more particularly to the drawings illustrating one exemplary embodiment of the present invention, and wherein like reference numerals have been used to designate corresponding parts in the various views, the assembly of main conductors constituting the cable proper, which may consist of one or several central conductors, is designated by reference numeral 1. This cable 1 is driven longitudinally by a conventional drive means (not shown) in the direction of the arrow through a tube 2, which is rotated about its axis at a prescribed rate proportional to the rate of advance of the cable 1 passing therethrough. The tube 2 is extended at the exit end by a guide member or finger 3 having a form similar to a pigtail curled so as to trail in the direction of rotation thereof, as is more clearly apparent from FIGURES 2 and 3.

Disposed at regular intervals around the cable 1 are a plurality of coils, of which coils 4 and 4' are two examples, each of which coils supply one of the auxiliary wires, such as wires 5 and 5', which eventually constitute the meander form conductive layer on the cable. The auxiliary wires each pass from their coils through a guide conduit, such as the conduits 6 and 6', which guide the wires along a path parallel to the axis of the cable to a point adjacent to the guide member of finger 3 to as to provide a guiding of the wire into proper position for winding on the cable. As the cable 1 advances, the wires such as 5 and 5' are thus positioned, on leaving the guides 6 and 6', parallel to the axis of the cable.

Figure 2:
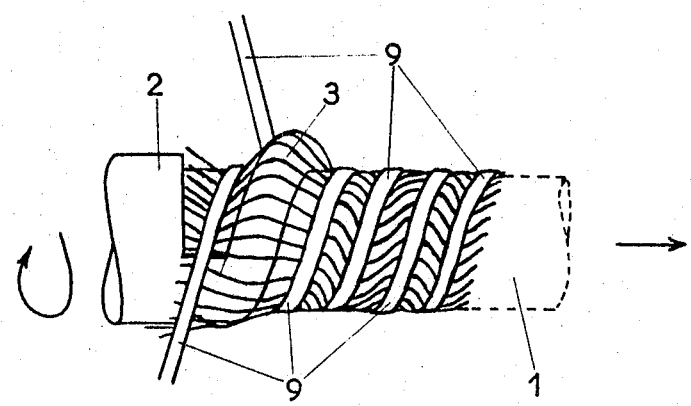
FIGURE 2 is a detailed diagramatic drawing illustrating the winding operation produced by the machine of FIGURE 1.
Figure 3:
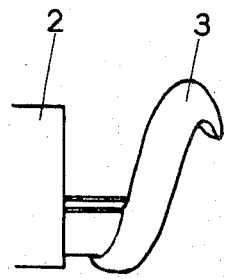
FIGURE 3 is a detailed illustration of the guide member or pigtail associated with the machine of FIGURE 1.

In addition, a taping head, generally denoted by 7, rotates parallel to the axis of the cable in the same direction and at the same speed as the tube 2. This taping head supports two coils 8 and 8' supplying tapes 9 and 9', respectively, which are constrained by guide members 10 and 10' to take up positions wherein two consecutive turns of the first tape 9 press the wires, such as wires 5 onto the cable on either side of the guide member of finger 3, while the second tape 9' presses that portion of the wires which form a meander after disengagement from the guide member against the cable body. FIGURE 2 clearly shows this arrangement.

The tube 2 and taping head 7 may be rotated by any known means, such as the gear arrangement illustrated in FIGURE 1. In the illustrated example, the tube 2 and taping head 7 are provided with sprockets 11 and 11', respectively cooperating through sprocket chains 12 and 12', engaging with pinions 13 and 13' mounted on a common drive shaft 14 whose rotational movement is synchronized with the advance movement of the cable.

In operation of the device, drive means (not shown) drive the cable 1 longitudinally in the direction of the arrow, as shown in FIGURE 1, through the rotating tube 2. The auxiliary wires are extended from their respective coils such as coils 4 and 4', through the guide members 6 and 6' to a point adjacent the rotating finger or guide member 3 and are secured to the cable 1 by means of the tapes 9 and 9' supplied by the tape head 7 from the tape coils 8 and 8'.

In the absence of the finger or guide member 3, the auxiliary wires 5 and 5' would extend along cable 1 without change in direction necessary to provide the meander-like disposition on the cable. However, the passage of the finger or guide member 3 beneath the auxiliary wires at a point below that at which they are secured by the tape 9 causes a distortion in the wires in the direction of rotation of the cable, i.e., opposite to the normal direction or pitch of the wires, which distortion is then fixed by the tape 9'. Thus, as the finger or guide member 3 passes down a helical path along the length of the cable it will distort the auxiliary wires along that helical path in a direction opposite to their normal disposition as a result of the turning of the cable producing a meander-like disposition which is then fixed by the tapes 9 and 9'.

The pitch of the helical path traversed by the guide member or finger 3 which produces the meander-like disposition of the auxiliary wires is controlled by the relative speed of the advance of the cable and the speed of rotation of the tube. Thus, the degree of undulation can be very easily controlled in the machine in accordance with the present invention through regulation of the speed of advance of the cable or regulation of the speed of rotation of the tube 2.

The invention is not limited to the exemplary embodiment specifically described and illustrated herein, but covers all variants thereof. More particularly, the device for guiding the auxiliary wires may consist of an individual conduit, such as the guides 6 and 6', for each wire, or may consist of a cylindrical body having internal longitudinal grooves for each wire. The tape supplying the auxiliary wires to the cable also may optionally consist of metal rather than the normal binder tapes previously utilized.

I claim:
1. A machine for the production of an electric concentric cable of the "meander" type comprising
 a central cable,
 a tube supported for rotation with said central cable passing longitudinally therethrough and means for rotating said tube,
 a plurality of supply coils of auxiliary wires disposed at intervals about the circumference of said cable, said auxiliary wires being fed to said cable at the exit point from said rotating tube with a given disposition with respect thereto,
 a guide finger extending from the exit end of said rotating tube to beneath said auxiliary wires on said cable so as to distort said wires from their given disposition only within a helical path extending along the length of said cable, and
 securing means for winding securing members around said cable on both sides of said guide finger and over the area of said helical path after passage of said guide finger to secure both the non-distorted portions and the distorted portions of said auxiliary wires.

2. A machine as defined in claim 1 further including guide means for said auxiliary wires disposed about said cable for guiding said wires along a path parallel to the axis of said cable.

3. A machine as defined in claim 2 wherein said guide means is provided in the form of individual guide tubes for each auxiliary wire fixedly supported parallel to said cable.

4. A machine as defined in claim 1 wherein said guide finger is in the form of a pigtail curled so as to trail in the direction of rotation thereof with a pitch equal to the pitch of said helical path.

5. A machine as defined in claim 1 wherein said securing means includes a tape head substantially concentric with said cable and said rotatable tube, and means for rotating said tape head in the same direction and at the same speed as said tube.

6. A machine as defined in claim 5 wherein said tape head includes coils of first and second tapes and tape guides for positioning said tapes on said cable with respect to said guide finger for securing said auxiliary wires in a meander-like disposition on said cable.

7. A machine as defined in claim 1 wherein the pitch of said helical path is based on the relation between the rate of passage of said cable through said tube to the rate of rotation of said tube.

8. A machine as defined in claim 3 wherein said guide finger is in the form of a pigtail curled so as to trail in the direction of rotation thereof with a pitch equal to the pitch of said helical path.

9. A machine as defined in claim 8 wherein said securing means includes a tape head substantially concentric with said cable and said rotatable tube, and means for rotating said tape head in the same direction and at the same speed as said tube.

10. A machine as defined in claim 9 wherein said tape head includes coils of first and second tapes and tape guides for positioning said tape on said cable with respect to said guide finger for securing said auxiliary wires in a meander-like disposition on said cable.

References Cited

UNITED STATES PATENTS

| | | | |
|---|---|---|---|
| 2,258,687 | 10/1941 | Peterson | 174—115 |
| 3,059,404 | 10/1962 | Benfer et al. | 57—6 |
| 3,247,036 | 4/1966 | Nystrom et al. | 156—50 |

BILLY S. TAYLOR, *Primary Examiner.*

U.S. Cl. X.R.

156—50; 174—102